UNITED STATES PATENT OFFICE.

JOB R. INSKEEP, OF GALION, OHIO.

FUMIGATING COMPOSITION.

No. 806,976.     Specification of Letters Patent.     Patented Dec. 12, 1905.

Application filed December 22, 1904. Serial No. 237,993.

*To all whom it may concern:*

Be it known that I, JOB R. INSKEEP, a citizen of the United States, residing at Galion, in the county of Crawford and State of Ohio, have invented certain new and useful Improvements in Fumigating Compositions, of which the following is a specification.

This invention relates to fumigating materials, particularly those adapted for use in the preservation of foods, and has for its object to provide an improved fumigating composition which can be employed in the preservation of perishable foods of all kinds and which does not affect the appearance or flavor of the food materials preserved therewith.

Another object of this invention is to provide a fumigating composition which can be readily ignited and which when ignited will burn without the application of external heat.

A further object of my invention is to provide an inexpensive and reliable fumigating composition which requires no special apparatus for its successful use and which is particularly adapted for preserving fruits, vegetables, meats, oysters, eggs, and the like in any ice-chest, refrigerator, provision-safe, or other commonly-used repository of perishable food materials.

In its preferred embodiment my improved fumigating composition consists in a mixture of the following materials in the proportions stated, said proportions being by weight: flowers of sulfur, one hundred and sixty parts; powdered willow-charcoal, thirty-two parts; New Orleans molasses, sixteen parts; powdered hickory-bark, six parts; powdered licorice-root, four parts; grated lemon-peel, one part. These materials when thoroughly mixed together are ready for use.

In the practical employment of my improved fumigating composition it is ignited, and the food to be preserved is exposed to the fumes arising therefrom.

No special apparatus is necessary in using my composition, as the fumigation of foods therewith may be carried out in any well-known manner.

A desirable method of employing my composition in stores, markets, and the like consists in burning a small amount of it in meat-storage chambers, refrigerators, or similar food-repositories just before closing such stores or markets for the night or for a Sunday or holiday and allowing the fumes to remain in contact with the food to be preserved until it is necessary to open the food-repository in which the fumigation is conducted.

For certain purposes it is not absolutely necessary to employ the willow-charcoal and molasses in connection with the other ingredients of my combination. The said charcoal and molasses are not essential to the satisfactory operation of my compound, and their use, it is to be understood, is optional.

Having thus described my invention and the best means known of carrying the same into practical effect, what I claim, and desire to secure by Letters Patent, is—

1. A fumigating composition containing sulfur, licorice-root, lemon-peel, and hickory-bark.

2. A fumigating composition containing sulfur, charcoal, saccharine matter, hickory-bark, licorice-root and lemon-peel.

3. A fumigating composition consisting of flowers of sulfur, one hundred and sixty parts, powdered willow-charcoal, thirty-two parts, New Orleans molasses, sixteen parts, powdered hickory-bark, six parts, powdered licorice-root, four parts, grated lemon-peel, one part.

In testimony whereof I affix my signature in presence of two witnesses.

JOB R. INSKEEP.

Witnesses:
   H. R. SCHULER,
   PHILIP SCHULER.